(12) United States Patent
Menzel et al.

(10) Patent No.: US 9,998,451 B2
(45) Date of Patent: Jun. 12, 2018

(54) METHOD FOR COMMUNICATING BETWEEN A FIRST MOTOR VEHICLE AND AT LEAST ONE SECOND MOTOR VEHICLE

(75) Inventors: Marc Menzel, Weimar (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 790 days.

(21) Appl. No.: 13/515,783

(22) PCT Filed: Dec. 10, 2010

(86) PCT No.: PCT/EP2010/069414
§ 371 (c)(1),
(2), (4) Date: Jun. 13, 2012

(87) PCT Pub. No.: WO2011/082948
PCT Pub. Date: Jul. 14, 2011

(65) Prior Publication Data
US 2012/0252415 A1    Oct. 4, 2012

(30) Foreign Application Priority Data
Dec. 14, 2009    (DE) .................. 10 2009 058 073

(51) Int. Cl.
*H04L 29/06*    (2006.01)
*H04L 29/08*    (2006.01)
(52) U.S. Cl.
CPC ............ *H04L 63/083* (2013.01); *H04L 67/12* (2013.01); *H04L 67/18* (2013.01)
(58) Field of Classification Search
CPC ... H04W 4/046; H04W 12/06; H04W 76/021; H04W 76/002; H04W 4/06;
(Continued)

(56) References Cited

U.S. PATENT DOCUMENTS 7,233,281 B1    6/2007 Chou
2002/0174364 A1    11/2002 Nordmann et al.
(Continued)

FOREIGN PATENT DOCUMENTS

DE    10 2005 013 648    9/2006
DE    10 2005 013 648 A1    9/2006
(Continued)

OTHER PUBLICATIONS

Maxim Raya; Panos Papadimitratos, Jean-Pierre Hubaux; Securing Vehicular Communications; vol. 13, No. 5; pp. 8-15; ISSN 1536-1284; XP 011143978; Oct. 1, 2006; New York; US.
(Continued)

*Primary Examiner* — Christopher M Brandt
*Assistant Examiner* — Jing Gao
(74) *Attorney, Agent, or Firm* — Cozen O'Connor

(57) ABSTRACT

A method for communicating between a first motor vehicle and at least one second motor vehicle, belonging to a mobile communication network including at least two motor vehicles. In a first step only one identifying piece of information is exchanged between the vehicles by each driver for forming a communication network by a radio communication unit via radio connection in order to initiate the internal communication of the vehicles present in a column formation, said piece of information being entered in a second step into a network communication unit of each vehicle, in order to join the communication network after acknowledgement by a network communication unit of at least one of the other vehicles belonging to the communication network. The identifying piece of information is an authentication, and the authentication takes place for each vehicle by a randomly generated password.

14 Claims, 1 Drawing Sheet

(58) Field of Classification Search
CPC . H04W 76/023; H04W 64/006; H04W 84/18; H04W 4/028; H04W 12/10; H04L 63/083; H04L 67/18; H04L 67/12
USPC .......................................................... 455/411
See application file for complete search history.

(56) References Cited

U.S. PATENT DOCUMENTS

| | | | |
|---|---|---|---|
| 2003/0073406 | A1 | 4/2003 | Benjamin et al. |
| 2004/0073562 | A1 | 4/2004 | Mitterreiter et al. |
| 2006/0161341 | A1 | 7/2006 | Haegebarth et al. |
| 2006/0198448 | A1* | 9/2006 | Aissi ................ H04W 88/02 375/259 |
| 2006/0271290 | A1 | 11/2006 | Li |
| 2008/0059067 | A1 | 3/2008 | Kuo et al. |
| 2008/0234925 | A1 | 9/2008 | Lo |
| 2009/0134977 | A1* | 5/2009 | Grewe ................ G06K 7/0008 340/10.3 |
| 2009/0207004 | A1* | 8/2009 | Ziska et al. .......... 340/426.1 |
| 2010/0061362 | A1* | 3/2010 | Wang ................ H04B 1/713 370/350 |

FOREIGN PATENT DOCUMENTS

| | | |
|---|---|---|
| DE | 10 2006 007 921 A1 | 10/2006 |
| DE | 10 2006 043 026 A1 | 12/2007 |
| DE | 10 2008 039 832 A1 | 3/2009 |
| DE | 10 2008 009 330 A1 | 6/2009 |
| DE | 10 2008 061 303 A1 | 6/2009 |
| DE | 10 2008 061303 | 6/2009 |
| EP | 1 681 663 A1 | 7/2006 |
| JP | 2005-174237 | 6/2005 |
| JP | 2005-174237 A | 6/2005 |
| WO | WO 02/096062 A1 | 11/2002 |
| WO | WO 03/019896 A2 | 3/2003 |
| WO | WO 2007/101703 A2 | 9/2007 |
| WO | WO 2007101703 A2 * | 9/2007 |
| WO | WO 2011/083004 A1 | 7/2011 |

OTHER PUBLICATIONS

Yasser Toor; Paul Mühlethaler; Vehicle AdHoc Networks: Applications and related technical issues; vol. 10, No. 3; pp. 74-88;; ISSN 1553-877X; XP011234563; Jul. 1, 2008; New York; US.

Toor Y. et al. "Vehicle Ad Hoc networks: applications and related technical issues", IEEE Communications Surveys, IEEE, New York, NY, US, Bd. 10, Nr. 3, Jul. 1, 2008, Seiten 74-88, XP001234563.

Maxim Raya et al. "Securing Vehicle Communications" IEEE Communications, IEEE Service Center, Piscataway, NJ, US Bd. 13, Nr. 5, Oct. 1, 2006, Seiten 8-15, XP011143978.

* cited by examiner

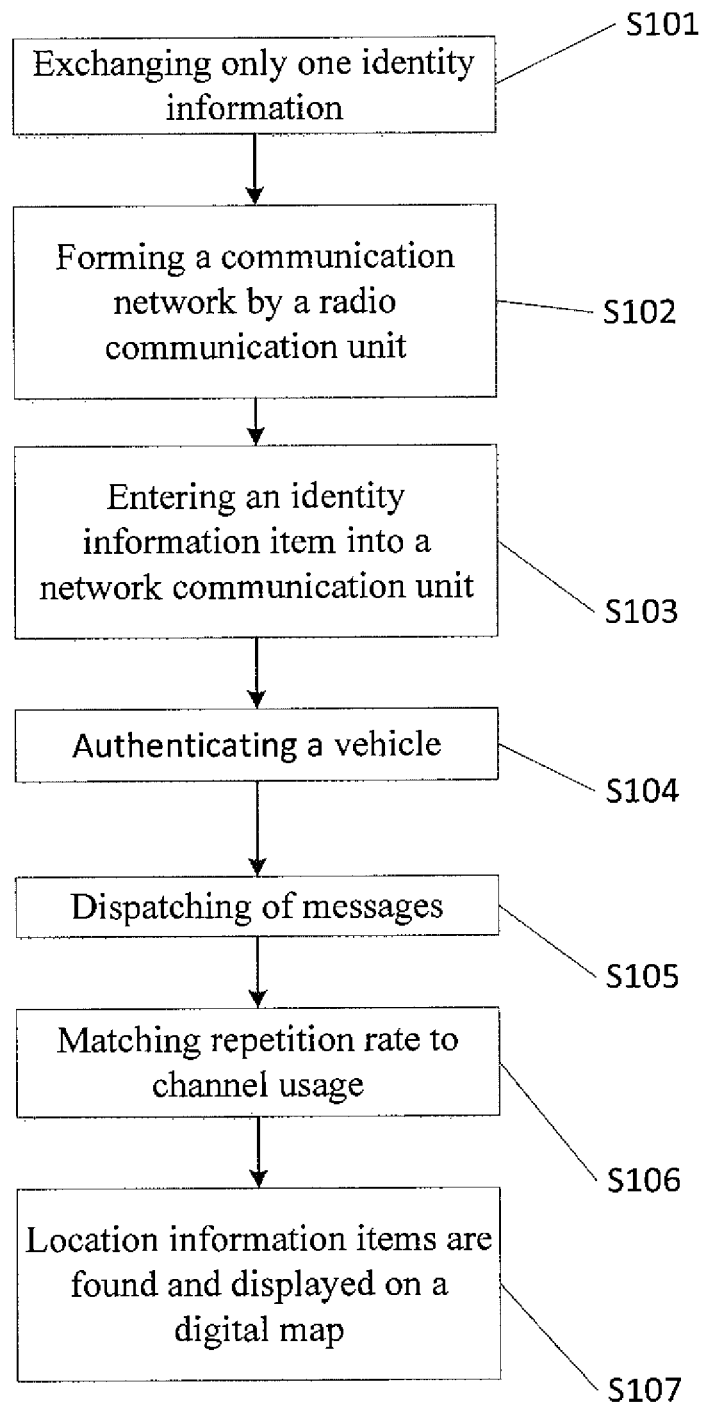

METHOD FOR COMMUNICATING BETWEEN A FIRST MOTOR VEHICLE AND AT LEAST ONE SECOND MOTOR VEHICLE

CROSS REFERENCE TO RELATED APPLICATIONS

This is a U.S. national stage of application No. PCT/EP2010/069414, filed on 10 Dec. 2010. Priority is claimed on German Application No. 10 2009 058 073.5 filed 14 Dec. 2009, the content of which is incorporated here by reference.

BACKGROUND OF THE INVENTION

1. Field of the Invention

The present invention relates to a method for communicating between a first motor vehicle and at least one second motor vehicle in a mobile communication network comprising at least two motor vehicles.

2. Description of Prior Art

The field of application of the invention relates to a so-called vehicle-to-vehicle communication, which is also called "car-to-car communication", and manages completely without stationary communication nodes. Such communication networks are used today mainly in commercial vehicles which are in a column formation in order to transport goods from a departure location to a common destination. The communication accompanying this transport task allows simple coordination of the individual vehicles during the trip. Thus, traffic disturbances, planned trip interruptions and the like can be communicated between the vehicles during the trip.

Modern vehicles are frequently equipped with keyless access systems or radio keys called Remote Keyless Entry (RKE). These radio keys control the locking and unlocking of doors and boot of a motor vehicle by radio control. In this manner, the vehicle door locks of a motor vehicle can be opened or closed wirelessly. Other functions can be activated or deactivated via radio keys such as the immobilizer.

A radio key system comprises a receiver at the vehicle and or a vehicle module, respectively, and one or more mobile transmitters, which can be held in one's hand. The transmitter or the portable module can be provided with one or more manually operable switches. Furthermore, they are radio keys of more recent generations in the case of which the radio key is no longer taken in one's hand but the transmitter at the vehicle end registers the closeness of the key to the vehicle and unlocks the door lock, for example due to the door handle being touched by the driver. Dispensing with manual inputs via the radio key transmitter becomes possible using so-called bidirectional communication. Differently from a conventional radio key central locking system, the radio key transmitter sends not only signals to the locking system but also it receives information from the locking system. In this context, the radio key transmitter is constructed as a transceiver. With passive start and entry (PA-SE), the doors become unlocked by touching the door handle alone, and the engine can be started without a key by button pressure. In this context, the transceiver at the vehicle end has a memory that stores an identification code that can identify the radio key transmitter.

The exchange of information with various vehicles which participate in the traffic, and between vehicle and infrastructure, can contribute to an increase in the safety of the road users and in the comfort of the vehicle drivers. This communication from vehicle to vehicle or from vehicle to infrastructure, which will be called vehicle-to-X communication (C2X communication) in the text that follows can only be utilized if a certain proportion of the vehicles or infrastructural units involved is equipped with corresponding communication units based on the same technology. The rapidly changing communication technology and in dependence on the price expectations of the vehicle drivers, the additional expenditure for providing and installing such a communication unit, associated with the upgrading of the vehicles, can be too high. Therefore, simple and cost-effective solution options are needed which will make vehicle-to-X communication available for many vehicle owners.

In JP 2005174237 A, a familiar system for communication between vehicles of a communication network is found based on the broadcasting principle. In this arrangement, the driver of a vehicle can transmit by radio telephony information which can be received by other vehicles. For this purpose, a radio communication frequency, on which the voice communication is to take place, must first be specified between the vehicles. As an alternative, it is also conceivable to exchange the information on a general voice channel, the affiliation with a certain communication network being transmitted by an identity information item initiating the voice communication. The solution presented in this prior art is mainly dedicated to measures for eliminating communication disturbances during the vehicle-to-vehicle communication.

In DE 10 2005 013 648 A1, a further system for communication between vehicles of a communication network is found. A first motor vehicle or a stationary network node sends out beacons that comprise at least one information item about the position of the first motor vehicle or of the stationary network node, a time interval between two beacons sent by the first motor vehicle being set in dependence on the speed of the first motor vehicle, the number of motor vehicles belonging to the communication network within the receiving range of the first motor vehicle or of the stationary network node, the position of the first motor vehicle, the time and/or the condition of the first motor vehicle or of the stationary network node. In this context, communication between individual motor vehicles in the communication network takes place entirely without the necessity of stationary communication nodes.

It is also provided that the communication between the motor vehicles not located within mutual receiving range takes place by a suitable routing method via further motor vehicles of the communication network. This is preferably carried out via WLAN or by using known Internet protocols. Initiating the internal communication requires setting up a connection corresponding to the communication technology.

SUMMARY OF THE INVENTION

It is an object of one embodiment of the present invention to improve a method for communicating between a first motor vehicle and at least one second motor vehicle within a communication network to the extent that a reliable connection set-up of a motor vehicle to the communication network is made possible with simple technical elements that allows a secure closed communication within the communication network.

The communication via RKE, described in the further text, must not be interpreted to be restrictive but considered as a possible type of communication.

In a first advantageous embodiment of the method for communicating between a first motor vehicle and at least one second motor vehicle, which belong to a mobile communication network comprising at least two motor vehicles, in a first step only one identity information item is exchanged between the vehicles by each driver for forming a communication network by a radio communication unit via radio connection in order to initiate the internal communication of the vehicles present in a column formation, this information item being entered in a second step into a network communication unit of each vehicle in order to join the communication network after acknowledgement by a network communication unit of at least one of the other vehicles belonging to the communication network. For this purpose, the identity information item is an authentication. The authentication for the respective vehicle takes place by a password generated in accordance with the random-number principle. For this purpose, it is considered to use a random-number generator. For this purpose, an arithmetic random-number generator or a recursive arithmetic random-number generator, a congruency generator, a Fibonacci generator, an inverse congruency generator, or a Mersenne twister is used.

A further advantageous embodiment of the invention is characterized by the fact that, after the authentication, a selective dispatching of the messages takes place with a low repetition rate via the communication unit available in the respective vehicle and the repetition rate is matched to the respective channel usage.

In a further embodiment of the method according to the invention it is particularly advantageous that the message contains at least one location information item, the one GNSS position and one identity freely selectable by the driver, and is encrypted symmetrically.

According to a further exemplary embodiment, the location information items received are found and displayed on a digital map of the navigation unit of the vehicle as the current positions of all vehicles of the communication network.

According to a further particularly advantageous exemplary embodiment of the method according to the invention, the positions of the other vehicles relative to the position of one's own vehicle are displayed on the digital map.

The method according to one embodiment of the invention is particularly advantageous when the information exchange between the drivers of the vehicles of the communication network is carried out via a closed radio telephony link and the information exchange between the drivers of the vehicles of the communication network is carried out via a closed text message link.

In a further advantageous embodiment of the method according to the invention, navigation information items are exchanged between the network communication units of the vehicles within the communication network.

It is particularly advantageous that a warning information item is sent to the network communication units of the vehicles if one of the vehicles is affected by a disturbing event with respect to the maintenance of the column formation.

A further particularly advantageous embodiment enables the driver to select from a group of disturbing events for example: exceeding a defined maximum distance of a vehicle from the other vehicles; accident-related stopping of a vehicle; vehicle defect-related stopping of a vehicle; leaving of a planned column route by a vehicle.

It is particularly advantageous in a further embodiment of the method according to the invention that, in the case of a disturbing event occurring, a voice link is set up between the vehicles of the column.

A further advantageous embodiment of the method according to the invention is characterized by the fact that the network communication unit is constructed for transmitting messages as wireless access and trip authorization unit and/or on the basis of WLAN.

BRIEF DESCRIPTION OF THE DRAWINGS

FIG. 1 is a flow chart of the disclosed method.

DETAILED DESCRIPTION OF THE PREFERRED EMBODIMENTS

Entry into this circle of closed communication is achieved by the inventive initiation process which, in terms of communication, represents a so-called handshake between the communication units to be connected. The prerequisite for this is that the vehicles can contact the respective other vehicles of the column formation by mobile communication for the purpose of exchanging identities in order to subsequently join the communication network by inputting the same identity information item. After this handshake, each radio communication unit, which can be designed as wireless access and trip authorization unit (RKE) in a simple embodiment, recognizes whether an information item comes from a vehicle of the column formation or from a strange vehicle. This forms the technical prerequisite for coordinating the column formation with regard to its task.

The radio communication unit used for exchanging the identity information item preferably comprises a radio telephony unit so that a motor vehicle wishing to enter can obtain the identity information item, required for entry into the communication network, in a simple manner by voice communication. The radio telephony unit can be, for example, an FM radio telephone. However, it is also conceivable to use conventional mobile telecommunication networks such as GSM, GPRS, UMTS or LTE for exchanging the identity information item. Apart from a radio telephony unit, the network communication unit providing for the closed information exchange within the communication network can also be an integral component of the radio communication unit. This must be equipped with means for inputting the identity information item in order to carry out the initiation, according to the invention, of the internal communication. The network communication unit, too, can be used for voice communication between the vehicles of the communication network. Apart from this, however, it is also possible to arrange this communication by data transmission, for example by text messages.

According to a measure improving the invention, it is proposed to demand the acknowledgement of all remaining vehicles of the communication network already-existing for the entry of a new vehicle into an existing communication network. This ensures that all remaining vehicles are aware of the new entry of a new vehicle into the communication network and allow this entry.

According to another measure improving the invention, the inventive radio communication unit is in communication with a navigation unit of the vehicle. This forms the equipment-related prerequisite for exchanging navigation information as well as organizational information within the closed communication network.

For the internal communication within the communication network to be safeguarded against external influences, it is proposed to use commonly-used encryption algorithms for this purpose. Due to the security against interception guaranteed by this, interference of the communication network can be avoided.

Having regard to the integration of navigation units of the vehicles into the closed communication network, it is proposed, according to a further measure improving the invention, to find and display the current position of all vehicles of the communication network on a digital map of the respective navigation unit of the vehicle. As a result, each driver obtains an overview of the current position of the remaining vehicles of the communication network. In addition, the positions of the other vehicles relative to the position of one's own vehicle should advantageously also be displayed on the digital map in order to be able to estimate the distances from one another. This provides the prerequisite for avoiding any unwanted pulling-apart of the column formation on the road, for example by reduction of the driving speed of the lead vehicle of a column formation.

Integrating the navigation unit into the communication network also allows others to exchange navigation information between the network communication units of the vehicles such as current speed of other vehicles, their predicted arrival time and the like.

According to another measure improving the invention, a warning information item is sent to the network communication units of the vehicles if one of the vehicles of the column formation is affected by a disturbing event with respect to the maintenance of the column formation. Such a disturbing event can be, for example, exceeding a defined maximum distance of a vehicle from the other vehicles; accident-related stopping of a vehicle; stopping of the relevant vehicle due to a vehicle defect and/or leaving a planned column route by a vehicle.

Due to the warning information, triggered as a result, to the other vehicles of the column formation, it is possible to react immediately to a disturbing event, for example by organizing an intermediate stop, and the column formation can be maintained in spite of such a disturbing event. Additionally to the measures explained above, it is proposed to set up a voice link between the vehicles of the column automatically on occurrence of a disturbing event. If the column formation is very large, it can then be previously determined to which vehicles of the column formation such a voice link is to be set up in the case of which event.

In this context, this restriction of the vehicles can be linked to vehicles in real terms, for example a predefined lead vehicle or certain monitoring vehicles of the column formation. Said voice link is advantageously established via standardized radio technologies such as WLAN, WiMax, GSM, UMTS, LTE, PMR and the like. The automatic voice link between the vehicles of the column formation on occurrence of a predefined disturbing event ensures that all members of the column formation remain informed about the condition of the column formation.

Coupling various vehicles of a column by communication and data exchange between the vehicles during a trip provides a distinctly recognizable benefit for the owners of vehicles with C2X technology already at low equipment rates. However, the solutions shown were previously designed for wideband communication technologies.

The starting point is a group of vehicles which wish to travel together such as, e.g. a sports club to a sporting event or a group of colleagues to a customer or a group of tradesmen to a construction site or several transports of a logistics company to a destination. Before the start of the trip, each driver activates in his vehicle the "group function" and enters a password. This password is identical for all involved parties in the group and identifies the vehicle as a part of the group, ideally therefore the password used is generated randomly.

Subsequently, each vehicle sends out a message via its communication technology, e.g. RKE, with low repetition rate such as, e.g., 0.1-0.2 Hz, the repetition rate also being matched to the channel usage, high channel usage entailing a lower repetition rate. This message is encrypted with a symmetric encryption such as, e.g., AES and can therefore only be decrypted by members of the group having the correct password.

In any event, the (GNSS) position is also sent in this message. Additionally, a freely selectable identity can be sent out (e.g. "boss", "outside left", "Bunny", "Detlef", . . . ) by which an allocation to a person within the group becomes possible.

The position can be displayed thereupon on a digital map and a different color can be used for each identity.

In addition, it is possible to activate than an identity is integrated into the message when a vehicle of the group carries out a maneuver (e.g. turning left), so that all other vehicles are informed about this maneuver (ideally, only the vehicle driving at the front sends this information). An identity can also be integrated into the message when a vehicle deviates from the planned route. For this purpose, each vehicle of the group must have a navigation system and have planned the route there.

Alternatively, the navigation systems of the following vehicles can also adjust themselves automatically so that they follow the "deviating driver" or catch him again.

In addition, it is helpful when each member of the group can integrate predefined messages into his message (e.g. "coming", "stuck in a jam", "standing in parking lot", "your light is out", "caution, speed camera!", . . . ). This message can be selected, e.g., via a touch screen or via other HMI methods. As an extension, a function similar to SMS can also be integrated which, however, leads to greater distraction.

By the method shown, the advantage of forming a column can already be used at low data rates by means of, e.g., RKE. It is especially the predefined messages which create an optimized utilization of the existing data rate.

The method for communicating between a first motor vehicle and at least one second motor vehicle, which belong to a mobile communication network having information exchange at least two motor vehicles, comprises exchanging only one identity information item between respective vehicles by each driver S101. A communication network is formed by a radio communication unit via radio connection to initiate internal communication of the vehicles present in a column formation based at least in part on the only one identity information item S102. The only one identity information item is entered into a network communication unit of each vehicle in order to join the communication network after acknowledgement by the network communication unit of at least one of the other vehicles belonging to the communication network S103. A respective vehicle is authenticated by a password generated in accordance with a random-number principle S104. Selective dispatching of messages occurs with a low repetition rate via the communication unit after the authentication S105. The repetition rate is matched to a respective channel usage S106. The message contains at least one of a location information item, one GNSS position, and one identity freely selectable by the driver. The location information items are found and displayed on a digital map of the navigation unit of the vehicle as current positions of all vehicles of the communication network S107.

As a supplement, it should be pointed out that "comprising" and "having" does not exclude any other elements or steps and "a" or "an" does not exclude a plurality. Furthermore, it should be pointed out that features or steps which have been described with reference to one of the above exemplary embodiments can also be used in combination with other features or steps of other exemplary embodiments described above. Reference symbols in the claims should not be considered to be restrictions.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for communicating comprising:
exchanging only one identity information item between respective vehicles by each driver, wherein the only one identity information item is provided by both a first motor vehicle and at least one second motor vehicle;
forming a communication network by a radio communication unit of the respective vehicles via radio connection to initiate internal communication of the first motor vehicle and the at least one second motor vehicle present in a column formation based at least in part on the exchanged only one identity information item;
entering the only one identity information item into a network communication unit of each of the respective vehicles in order to join the communication network after acknowledgement by the network communication unit of the at least one second vehicle belonging to the communication network;
authenticating the first motor vehicle by a password generated in accordance with a random-number principle,
wherein the only one identity information is an authentication;
determining a channel usage for each channel;
matching a repetition rate for dispatching messages to a respective channel usage, wherein the repetition rate on the respective channel decreases as usage on the respective channel increases; and
selective dispatching of the messages occurs with a low repetition rate on the respective channel via the radio communication unit available in a respective vehicle in the communication network based on channel usage on the respective channel.

2. The method as claimed in claim 1, wherein the selective dispatching of messages occurs after digital map authentication.

3. The method as claimed in claim 2, wherein the messages contain at least one of a location information item, one GNSS position, and one identity freely selectable by the driver,
wherein the message is encrypted symmetrically.

4. The method as claimed in claim 3, wherein the location information item is found and displayed on a digital map of a navigation unit of a respective vehicle as current positions of all vehicles of the communication network.

5. The method as claimed in claim 4, wherein current positions of other vehicles of the communication network relative to a position of a respective vehicle are displayed on the digital map.

6. The method as claimed in claim 1, wherein the only one identity information item exchanged between respective drivers of the respective vehicles of the communication network is carried out via a closed radiotelephony link.

7. The method as claimed in claim 1, wherein the only one identity information item exchanged between respective drivers of the respective vehicles of the communication network is carried out via a closed text message link.

8. The method as claimed in claim 1, wherein navigation information items are exchanged between respective network communication units of the respective vehicles within the communication network.

9. The method as claimed in claim 1, wherein a warning information item is sent to respective network communication units of the respective vehicles if one of the respective vehicles is affected by a disturbing event with respect to maintaining the column formation.

10. The method as claimed in claim 9, wherein the disturbing event is at least one of: exceeding a defined maximum distance of a vehicle from other vehicles; accident-related stopping of a vehicle; vehicle defect-related stopping of a vehicle; and leaving of a planned column route by a vehicle.

11. The method as claimed in claim 10, wherein, in case of the disturbing event occurring, a voice link is established between the respective vehicles of the column formation.

12. The method as claimed in claim 1, wherein the network communication unit is configured to transmit the messages as one of wireless access and trip authorization unit and based on wireless local area network (WLAN).

13. The method as claimed in claim 1, wherein high channel usage entails a lower repetition rate.

14. The method as claimed in claim 1, wherein the repetition rate is 0.1-0.2 Hz.

* * * * *